United States Patent
Murrah et al.

(10) Patent No.: US 8,797,320 B2
(45) Date of Patent: Aug. 5, 2014

(54) SURFACE SHADING OF COMPUTER-GENERATED OBJECT USING MULTIPLE SURFACES

(75) Inventors: John T. Murrah, Studio City, CA (US); Donald Adolph Lusinsky, Fullerton, CA (US); Henry Allen Driskill, Valencia, CA (US); Sean D. Jenkins, Sherman Oaks, CA (US); Ernest Petti, Burbank, CA (US); Lewis N. Siegel, Burbank, CA (US); Adrienne Othon, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1048 days.

(21) Appl. No.: 12/074,622

(22) Filed: Mar. 4, 2008

(65) Prior Publication Data

US 2009/0033663 A1 Feb. 5, 2009

Related U.S. Application Data

(60) Provisional application No. 60/953,663, filed on Aug. 2, 2007.

(51) Int. Cl.
G06T 15/00 (2011.01)
G06T 17/00 (2006.01)
G06T 15/50 (2011.01)
G06T 15/60 (2006.01)
G09G 5/02 (2006.01)

(52) U.S. Cl.
USPC ............ 345/426; 345/419; 345/420; 345/592

(58) Field of Classification Search
USPC ................... 345/419, 420, 592, 426
See application file for complete search history.

(56) References Cited

U.S. PATENT DOCUMENTS 5,933,146 A * 8/1999 Wrigley .................. 345/420
5,966,134 A * 10/1999 Arias ..................... 345/589

(Continued)

FOREIGN PATENT DOCUMENTS

EP 1170701 A2 1/2002

OTHER PUBLICATIONS

Rendering Fur with Three Dimensional Textures by Kajiya et al, Jul. 1989.*

(Continued)

*Primary Examiner* — Ke Xiao
*Assistant Examiner* — Robert Craddock
(74) *Attorney, Agent, or Firm* — Kilpatrick Townsend & Stockton LLP

(57) ABSTRACT

Objects are modeled and rendered using multiple surfaces to provide attributes used in rendering. In some embodiments, a reference surface for an object is defined, e.g., using conventional modeling techniques. One or more auxiliary surfaces are associated with portions of the reference surface. Some of the surface attributes (e.g., color, surface normal, texture, lighting) are associated with the reference surface, while other attributes (e.g., transparency) are associated with the cards. To render an image, a ray associated with a pixel is traced to its intersection with the reference surface and to its intersection with one of the auxiliary surfaces. The attributes associated with the reference surface are determined based on the intersection point of the ray with the reference surface, and the attributes associated with the auxiliary surface are determined based on the intersection point of the ray with the auxiliary surface.

27 Claims, 11 Drawing Sheets

(56) References Cited

U.S. PATENT DOCUMENTS 6,750,867 B1 6/2004 Gibson
2005/0084153 A1 4/2005 Khomo
2005/0151733 A1 7/2005 Sander et al.

OTHER PUBLICATIONS

Synthesizing Verdant Landscapes using Volumetric Textures by Fabrice Neyret, Dec. 1996.*
Neyret, Fabrice, "Modeling, Animating, and Rendering Complex Scenes Using Volumetric Textures", Mar. 1998, IEEE Transactions on Visualization and Computer Graphics, vol. 4, No. 1, pp. 55-70.*
Dooley et al., Automatic illustration of 3D geometric models: surfaces, Oct. 23, 1990, Visualization, 1990. Visualization '90, 307-314.*
International Search Report PCT/US2008/070456 dated Oct. 8, 2008.
Meier, "Painterly Rendering for Animation," International Conference on Computer Graphics and Interactive Techniques, ISBN:0-89791-746-4, 1996, pp. 477-484.
Sperl, Künstlerisches Rendering für Echtzeit-Applikationen [engl. "Painterly Rendering for Realtime Applications"] 2003 Master's thesis, Hagenberg College of Information Technology in Austria, URL http://www.incognitek.com/painterly/downloads/painterly paper.pdf.
Sperl, "Realtime Painterly Rendering for Animation," 2nd International Conference on Computer Graphics and Interactive Techniques. ISBN: 1581138849, 2004, pp. 1-6.
Karabassi, E.A., et al., "Exploiting multiresolution models to accelerate ray tracing," Computers and Graphics, Feb. 1, 2003, vol. 27, No. 1, pp. 91-98.
Luft, T., et al., "Non-photorealistic real-time rendering of characteristic faces," Proceedings of the $12^{th}$ Pacific Conference on Computer Graphics and Applications, 2004, Seoul, Korea, Oct. 6-8, 2004, pp. 339-347.
Sherstyuk, Andrei, "Ray-tracing with selective visibility," Journal of Graphics Tools, Aug. 15, 1997, pp. 1-4.
Winnemöller, Holger, et al., "Rendering optimisations for stylized sketching," Proceedings Afrigraph '03 Proceedings of the $2^{nd}$ International Conference on Computer Graphics, Virtual Reality, Visualisation and Interaction in Africa, Jan. 1, 2003, pp. 117-122.
Markosian, Lee, et al., "Art-based rendering with continuous levels of detail," Proceedings of the First International Symposium on Non-Photorealistic Animation and Rendering, NPAR '00, Jan. 1, 2000, pp. 59-66.
McGuire, M., et al., "Hardware-Determined Feature Edges," Proceedings NPAR 2004, $3^{rd}$ International Symposium on Non-Photorealistic Animation and Rendering, Annecy, France, Jun. 7-9, 2004, pp. 35-44.
Neihaus, M., et al., "Sketchy Drawings," $3^{rd}$ International Conference on Computer Graphics, Virtual Reality and Visualisation in Africa, Afrigraph 2004, Nov. 3, 2004, pp. 73-81.
Kalnins, Robert, D., et al., "WYSIWYG NPR: Drawing Strokes Directly on 3D Models," ACM Transactions on Graphics (TOG), Proceedings of the $29^{th}$ Annual Conference on Computer Graphics and Interactive Techniques, SIGGRAPH '02, Jul. 1, 2002, pp. 755-762.
Northrup, J.D., et al., "Artistic silhouettes: a hybrid approach," NPAR '00, Proceedings of the $1^{st}$ International Symposium on Non-Photorealistic Animation and Rendering, Jan. 1, 2000, pp. 31-37.
European Search Report mailed Dec. 17, 2012, European Application No. EP08796293.2, 14 pages.

* cited by examiner

SURFACE SHADING OF COMPUTER-GENERATED OBJECT USING MULTIPLE SURFACES

CROSS-REFERENCES TO RELATED APPLICATIONS

This application claims the benefit of U.S. Provisional Application No. 60/953,663, filed Aug. 2, 2007, entitled "Surface Shading of Computer-Generated Object Using Multiple Surfaces," which disclosure is incorporated herein by reference for all purposes.

BACKGROUND OF THE INVENTION

The present invention relates in general to computer-generated animation and in particular to generating images of three-dimensional objects using multiple surfaces to represent different attributes of the object.

Three-dimensional (3-D) animation generally begins with a geometric model of the objects that will appear in the animated scene. Each object is modeled, e.g., as a mesh of polygons in 3-D space, and various attributes of the object's surface are associated with points in the mesh, such as the vertices of the polygons. For example, attributes associated with a point often include a color, a surface normal, a transparency parameter, reflectivity parameters, and one or more sets of texture coordinates, allowing one or more textures to be applied to the surface.

To generate (render) the images, the positions of various objects in the scene are established; for animated images, each image is generated to correspond to a particular time, and positions of at least some objects may vary with time. A viewpoint, or virtual camera position, is established, and a screen area (generally normal to the camera) is defined. The screen area is divided into small sub-areas, referred to herein as pixels, and a color for each pixel is determined based on the attributes of the object (or objects) that project onto that pixel. Which object(s) project onto a pixel can be determined using a variety of techniques, including ray-tracing. In ray tracing, rays are drawn from the pixel to the object (or from the object to the pixel), and the intersection of the ray with the object's surface determines which portion of the object's surface (e.g., which polygon or which vertices) should be used to compute the pixel's color. Computers are used extensively in both the modeling and rendering phases.

Computer-generated 3-D animation (referred to herein as "CGA") usually approximates a photorealistic look. Objects have crisp, smooth edges and surfaces that do not bleed or smear into each other. In fact, one of the problems CGA faces is that surfaces and edges often look too smooth, lacking the roughness and imperfections of real-life objects.

Further, the photorealistic look of CGA is esthetically limiting. Traditional hand-drawn animation allows the animator to depart from a photorealistic look and adopt a more "painterly" style, with uneven brush strokes, "loose" paint at edges of objects and so on. The traditional animator can adapt the look of the animated world to fit the story being told, and this stylization is generally regarded as one of the advantages of animation over live action.

Efforts to duplicate this painterly look in CGA have not been satisfying. For instance, paintbrush textures have been applied to rendered scenes, but the result is usually a displeasing "screen door" effect as the characters and other objects move under a fixed texture. Other attempts to apply paintbrush-like textures to objects have led to distracting "popping" as loose fragments of virtual "paint" appear and disappear from one frame to the next. Some techniques for incorporating painterly elements, e.g., into backgrounds, have been developed, but these techniques generally have not scaled well or been easy to integrate into CGA processes.

It would therefore be desirable to provide improved computer-based techniques for rendering images with a painterly look.

BRIEF SUMMARY OF THE INVENTION

Embodiments of the present invention provide techniques for modeling and rendering objects in which multiple surfaces are used to determine attributes used in rendering. In some embodiments, a reference surface (also referred to herein as a primary surface) for an object is defined, e.g., using conventional modeling techniques. Then, one or more auxiliary surfaces (e.g., auxiliary polygons or "cards") are associated with portions of the reference surface. Some of the attributes of the object's surface (e.g., color, surface normal, texture, lighting) are associated with points on the reference surface, while other attributes (e.g., transparency) are associated with points on the auxiliary surface. To render an image, a ray associated with a pixel is traced to its intersection with the reference surface and also to its intersection with the auxiliary surface. The attributes associated with the reference surface are determined based on the intersection point of the ray with the reference surface, and the attributes associated with the card are determined based on the intersection point of the ray with the auxiliary surface.

In some embodiments, the auxiliary surface provides transparency attributes while all other attributes are determined from the reference surface. The transparency map can replicate the effect of a paintbrush stroke (thicker paint in some areas than others) or other pattern as desired. Auxiliary surfaces associated with different portions of the reference surface can provide different transparency maps, so that no repetitive pattern is evident in the rendered image.

The auxiliary surfaces are not required to form a closed or continuous surface. Instead, auxiliary surfaces can bristle from the reference surface (e.g., like fur) or protrude outward (e.g., like flanges). The auxiliary surfaces can be placed inside or outside the reference surface; to the extent that the auxiliary surfaces are external to the reference surface, they can be ignored during phases of rendering in which they would create undesired effects, e.g., when determining shadow volumes. The auxiliary surfaces advantageously have a fixed relationship to the reference surface so that if an object moves or rotates, the auxiliary surfaces move with the surface of the object. Deformation of the reference surface advantageously also deforms the auxiliary surfaces.

More generally, any number of auxiliary surfaces can be associated with the same portion of the reference surface, and different auxiliary surfaces can be associated with different attributes. For example, surface normals (or surface normal perturbations) can be associated with one auxiliary surface while transparency is associated with a second auxiliary surface and color and texture are associated with the reference surface.

One aspect of the present invention relates to a method for generating an image. A reference surface is defined for an object. The reference surface has at least a first attribute (e.g., color, surface normal, texture) associated therewith, and the first attribute having a value that is variable as a function of position on the reference surface. An auxiliary surface is also defined for the object and positioned in relation to a specified portion of the reference surface. The auxiliary surface has at least a second attribute (e.g., transparency) associated therewith, the second attribute having a value that is variable as a function of position on the auxiliary surface. A ray is traced for a pixel of an image raster, where the ray intersects a point on the reference surface and a point on the auxiliary surface. A value of the first attribute is determined based at least in part on the intersection point of the ray with the reference surface, and a value of the second attribute is determined based at least in part on the intersection point of the ray with the auxiliary surface. The values of the first attribute and the second attribute to determine a pixel color for the pixel.

Another aspect of the present invention relates to another method for generating an image. A reference surface is defined for an object. In this instance, the reference surface establishes a boundary between an interior region and an exterior region. The reference surface has at least a first attribute associated therewith. In this instance, the reference surface includes at least a first planar portion and a second planar portion that is not coplanar with the first planar portion; the first planar portion and the second planar portion meet at an edge line. A first planar auxiliary surface is also defined for the object. The first planar auxiliary surface extends from the edge line into the exterior region. The first planar auxiliary surface has a transparency attribute associated therewith. A primary ray for a pixel of an image raster is traced to an intersection point with the auxiliary surface. A value for the transparency attribute is determined based at least in part on the intersection point of the primary ray with the auxiliary surface. A deflected ray is traced from the intersection point of the primary ray with the auxiliary surface; the deflected ray is deflected toward the reference surface relative to the primary ray. An intersection point of the deflected ray with the reference surface is identified, and a value of the first attribute is determined based at least in part on the intersection point of the deflected ray with the reference surface. The values of the first attribute and the transparency attribute to determine a pixel color for the pixel.

These and similar methods can be used to create animated image sequences, such as animated motion pictures, where the images have a painterly appearance in which loose paint can appear to move with the object as the object's position or orientation changes from one image to the next.

The following detailed description together with the accompanying drawings will provide a better understanding of the nature and advantages of the present invention.

BRIEF DESCRIPTION OF THE DRAWINGS

FIG. 10 illustrates mapping of surface normals from the reference surface onto the cards.

FIG. 11 illustrates the image of FIG. 10 with additional non-silhouette textural detail.

FIG. 12 illustrates the further inclusion of surface color in the image.

DETAILED DESCRIPTION OF THE INVENTION

Embodiments of the present invention provide techniques for modeling and rendering objects in which multiple surfaces are used to determine attributes used in rendering. In some embodiments, a reference surface (also referred to herein as a primary surface) for an object is defined, e.g., using conventional modeling techniques. Then, one or more auxiliary surfaces (e.g., auxiliary polygons or "cards") are associated with portions of the reference surface. Some of the attributes of the object's surface (e.g., color, surface normal, texture, lighting) are associated with points on the reference surface, while other attributes (e.g., transparency) are associated with points on the auxiliary surface. To render an image, a ray associated with a pixel is traced to its intersection with the reference surface and also to its intersection with the auxiliary surface. The attributes associated with the reference surface are determined based on the intersection point of the ray with the reference surface, and the attributes associated with the card are determined based on the intersection point of the ray with the auxiliary surface.

In some embodiments, the auxiliary surface provides transparency attributes while all other attributes are determined from the reference surface. The transparency map can replicate the effect of a paintbrush stroke (thicker paint in some areas than others) or other pattern as desired. Auxiliary surfaces associated with different portions of the reference surface can provide different transparency maps, so that no repetitive pattern is evident in the rendered image.

The auxiliary surfaces are not required to form a closed or continuous surface. Instead, auxiliary surfaces can bristle from the reference surface (e.g., like fur) or protrude outward (e.g., like flanges). The auxiliary surfaces can be placed inside or outside the reference surface; to the extent that the auxiliary surfaces are external to the reference surface, they can be ignored during phases of rendering in which they would create undesired effects, e.g., when determining shadow volumes. The auxiliary surfaces advantageously have a fixed relationship to the reference surface so that if an object moves or rotates, the auxiliary surfaces move with the surface of the object. Deformation of the reference surface advantageously also deforms the auxiliary surfaces.

More generally, any number of auxiliary surfaces can be associated with the same portion of the reference surface, and different auxiliary surfaces can be associated with different attributes. For example, surface normals (or surface normal perturbations) can be associated with one auxiliary surface while transparency is associated with a second auxiliary surface and color and texture are associated with the reference surface.

Figure 1:
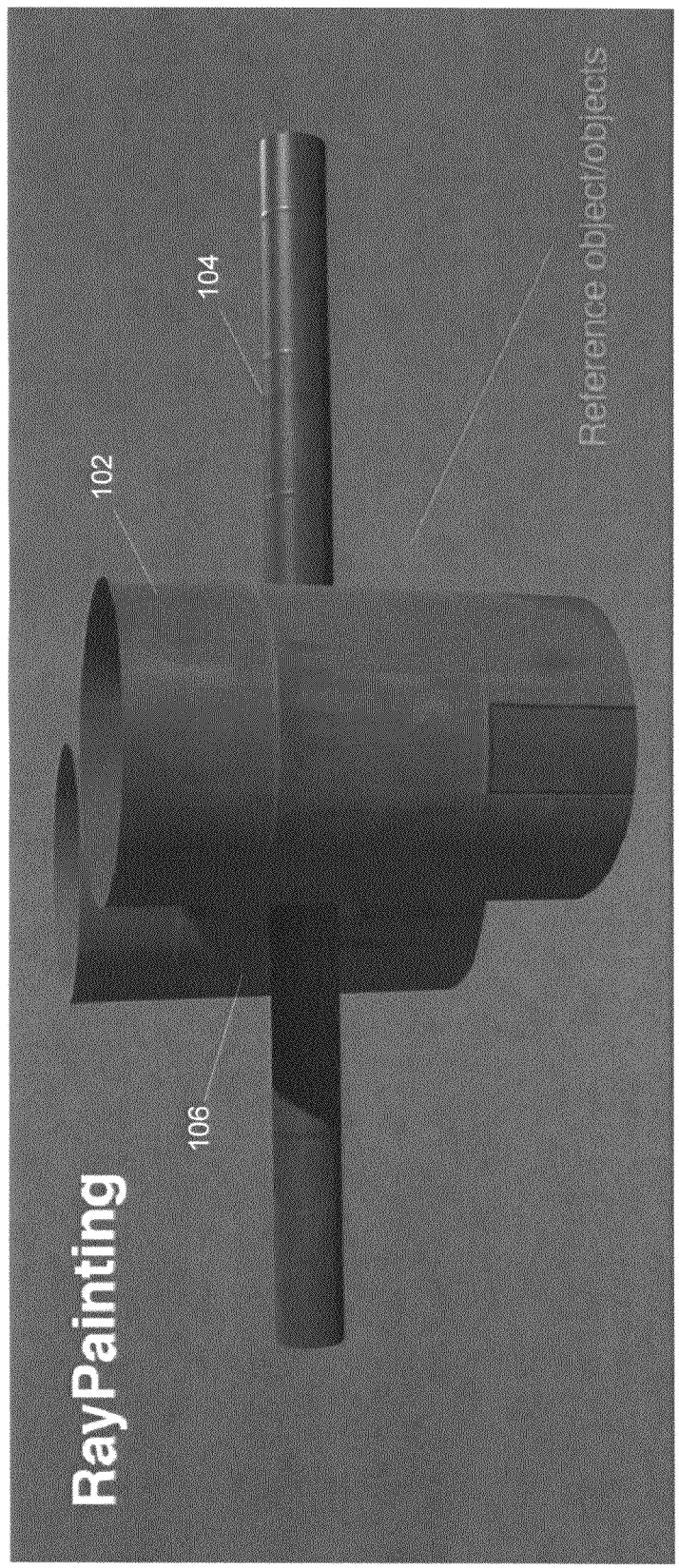
FIG. 1 is an image of a group of objects, rendered using conventional techniques; the objects also illustrate reference surfaces according to an embodiment of the present invention.

Referring first to FIG. 1, there is shown an image of a group of objects (cylinders 102, 104, 106). This image has been rendered using conventional computer-based rendering techniques. As can best be seen for cylinder 102, the surface of an object can have a texture applied thereto that gives the object the appearance of having been unevenly painted. However, FIG. 1 does not look like a painting of objects. For instance, the edges of each cylinder are sharp and distinct, lacking the distinctive painterly character of brush strokes. Thus, the image is a photorealistic rendering of cylinders that have been painted; it does not appear to be a painting of cylinders.

An embodiment of the present invention imparts a more painterly quality to the image. In this embodiment, a geometric model of each object to be rendered can be created, e.g., using conventional techniques. Thus, for example, the same geometric models used to generate cylinders 102, 104 and 106 in FIG. 1 can be used as initial geometric models in the present invention. The geometric model defines a surface, referred to herein as a reference surface or primary surface. In one embodiment, a reference surface can include a mesh of points (e.g., vertices of a polygon mesh), each of which has various attributes (e.g., color, texture(s), surface normal, etc.) associated therewith. More generally, a reference surface can be defined in any manner desired, provided that it is possible to associate attribute values with points on the reference surface.

Figure 2:
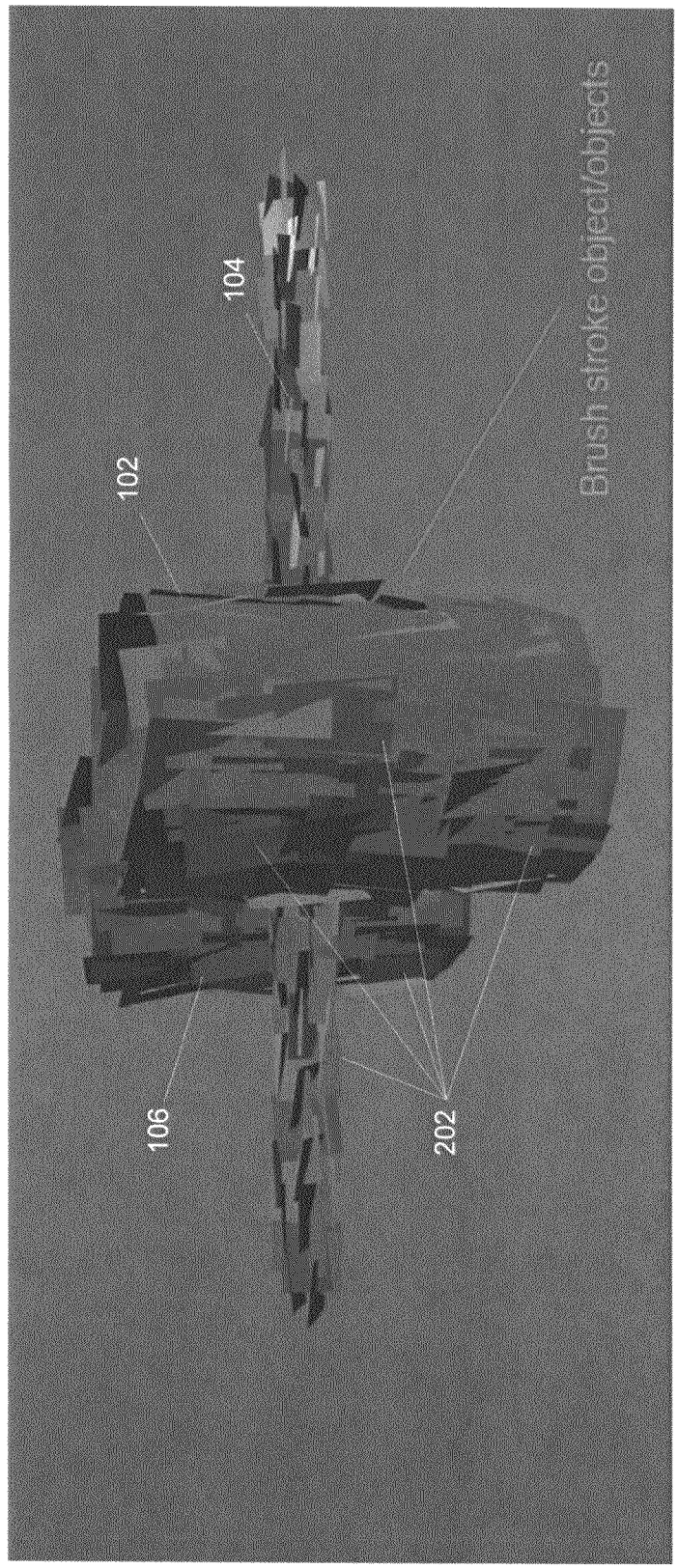
FIG. 2 shows auxiliary surfaces that can be associated with the reference surfaces of objects according to an embodiment of the present invention.

Next, a number of "cards" (also referred to as "auxiliary surfaces" or "brush stroke objects") are generated and associated with the reference surface. For example, FIG. 2 shows cards 202 that can be associated with the reference surfaces of cylinders 102, 104 and 106 according to an embodiment of the present invention. (Different cards are shown in different shades of gray in FIG. 2.) Each card can be planar, e.g., rectangular, trapezoidal, triangular, etc., and cards can intersect each other. A card can be as large or small as desired, although the maximum size of a card is advantageously limited to approximately the dimensions of the reference surface. The cards follow the general shape of the reference surface but do not precisely match that shape, as can be seen by comparing FIG. 2 to FIG. 1. The cards may or may not contact or intersect the reference surface, but there is preferably a fixed association between the location of each card and the location of a point on the reference surface. Thus, for instance, if the object turns or is viewed from a different angle, the cards also turn or are viewed from a different angle. Further, if the reference surface deforms, the cards advantageously deform as well.

Figure 3:
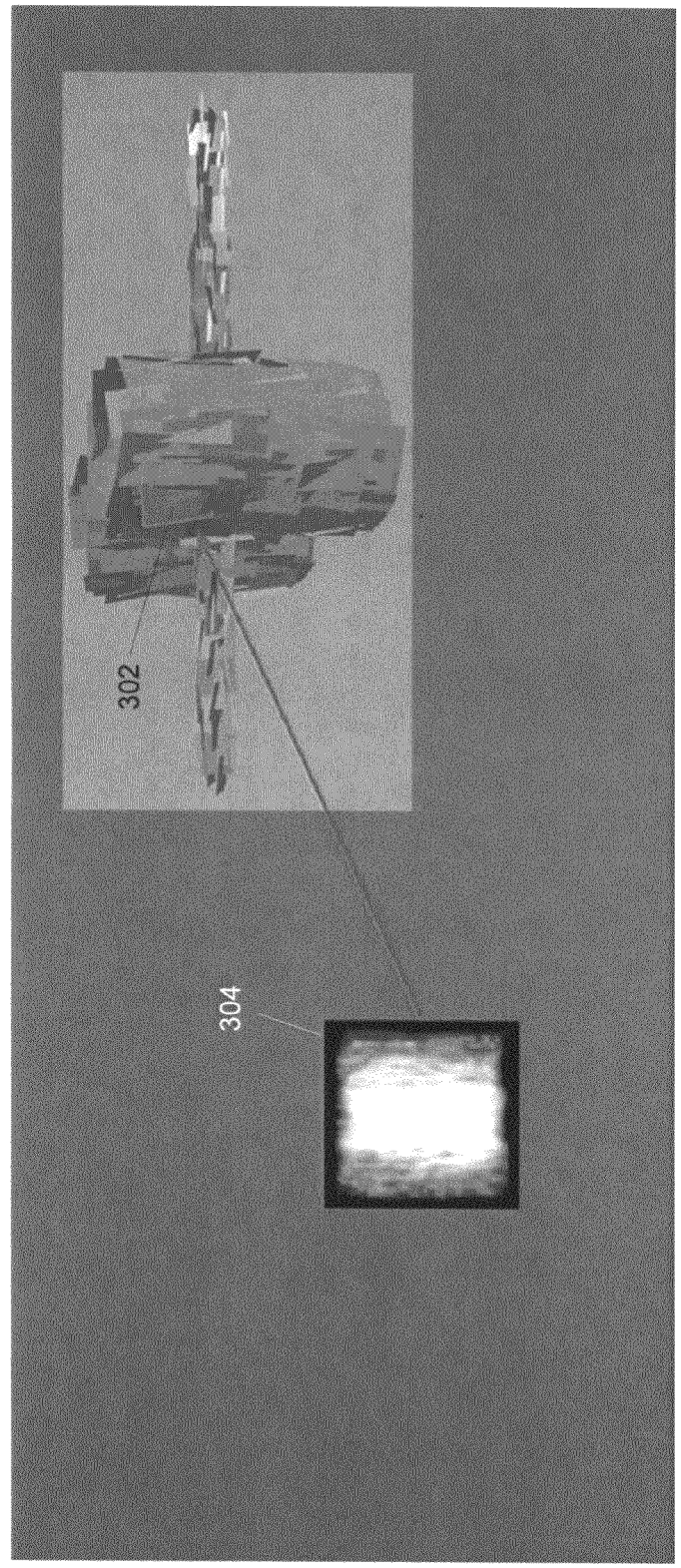
FIG. 3 illustrates a brush stroke transparency map (texture) that can be associated with an auxiliary surface according to an embodiment of the present invention.

Each card is patterned with a transparency map (texture) designed to represent an artist's brush stroke, as shown in FIG. 3, where map 304 represents a transparency map for a representative card 302. In transparency map 304, transparency is represented using a gray scale, with brighter shades of gray corresponding to higher opacity (lower transparency) and darker shades corresponding to lower opacity (higher transparency). In this example, card 302 is fully transparent (represented as black) near the edges, but the brush stroke could extend to points at the edges of the card if desired. The brush stroke transparency map can be different for different cards, to avoid creating detectable repetitive patterns in the image. It is believed that an optimum esthetic effect can be achieved if the various brush stroke texture maps on different cards are united by a common brush-stroke style. For instance, the brush stroke transparency maps can be modeled on representative brush strokes of a specific artist.

Cards associated with a reference surface can be defined during modeling. In one embodiment, a fur-growing program (examples of which are known in the art) can be used to create the cards, which can "grow" out from fixed points on or near the reference surface, and brush stroke textures can be generated procedurally and mapped onto the cards. Other techniques can also be used to generate cards.

Figure 4:
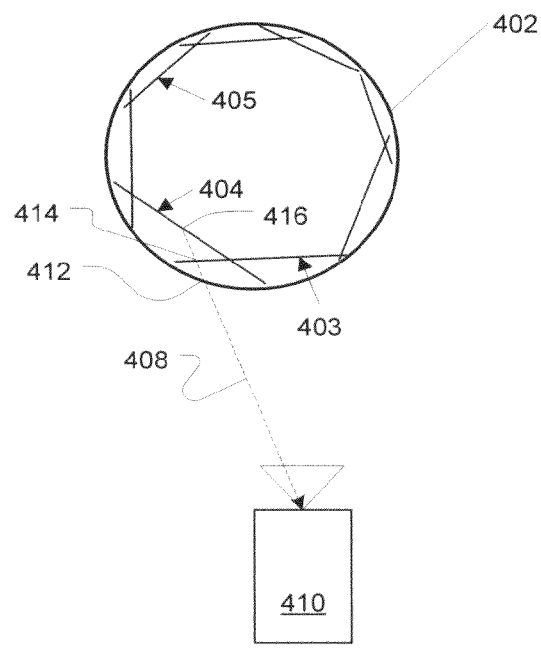
FIG. 4 illustrates, in top view, ray tracing for a reference surface for a cylinder and associated auxiliary surfaces (cards) according to an embodiment of the present invention.

During rendering, ray tracing techniques are used to map a pixel of a viewing window to a point on the reference surface and to one of the cards. FIG. 4 illustrates, in top view, a reference surface 402 for cylinder 102 of FIG. 1 and associated cards including cards 403, 404, 405. In this example, all cards are all inside reference surface 402, but this is not required. Some or all of the cards could intersect reference surface 402 and be partially or entirely outside surface 402. A ray 408 is traced between a (virtual) camera 410 and a point 412 on reference surface 402. (Ray tracing can be done from the object to the camera or from the camera to the object without departing from the scope and spirit of the invention.) Attribute values, such as color, surface normal, and textures are determined for point 412, e.g., using conventional interpolation techniques.

Ray 408 is extended further to intersect card 403 at a point 414, and a transparency value associated with point 414 is determined. If ray 408 does not extend through a card, then the object is treated as being fully transparent at that point. The pixel is then shaded using the 3-D space coordinates and transparency value associated with point 414 and the other attribute values associated with point 412. Conventional shading techniques may be used to compute a color from attribute values.

If card 403 is less than fully opaque at point 414, ray 408 can be further extended to its intersection with another card 404 at point 416, and the 3-D space coordinates and transparency value of point 416 can contribute to the pixel shading. Thus, as in conventional ray tracing, ray 408 can be extended to contact any number of surfaces until either a fully opaque surface is encountered or until enough opacity is encountered to accumulate full opacity. In some instances (e.g., where the surface attributes include a reflectivity coefficient), ray 408 may be fully or partially reflected off a surface. The angle of reflection is determined from the surface normal, which in some embodiments is provided by the primary surface (reference surface 402). (In alternative embodiments, the surface normal could be provided by an auxiliary surface, such as card 403.) Each point on any surface touched by the ray advantageously contributes its attributes to the pixel color.

Figure 5A:
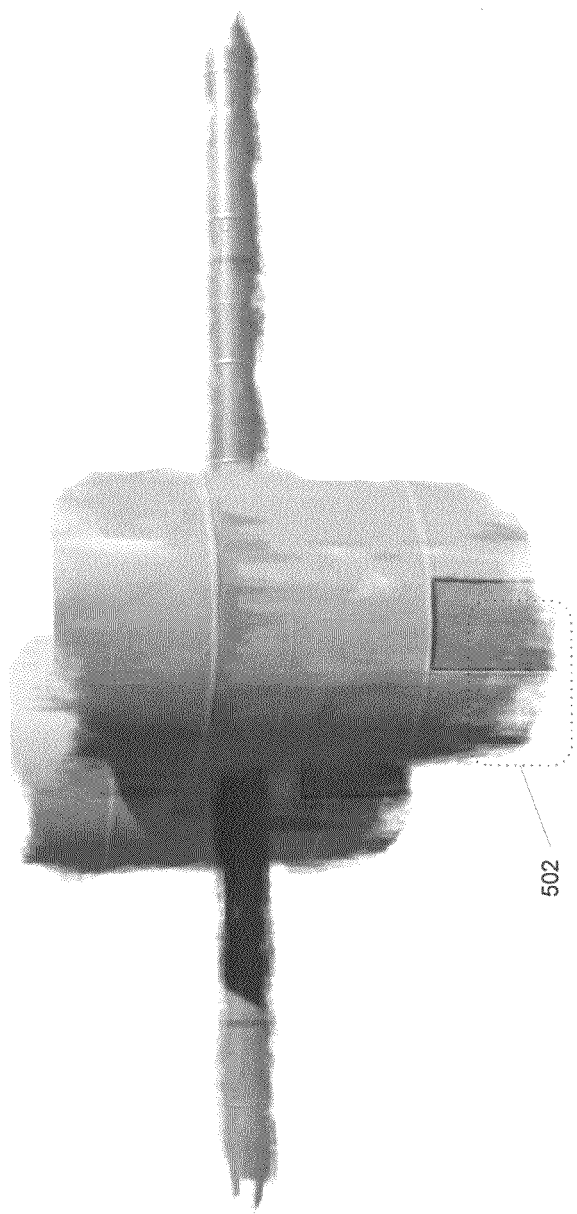
FIGS. 5A and 5B are images of the same objects as FIG. 1, rendered in accordance with an embodiment of the present invention.

FIG. 5A shows a resulting image of cylinders 102, 104 and 106, rendered from the same viewpoint as the image in FIG. 1. In FIG. 5A, the brush-stroke transparency map associated with the cards creates "loose" edges that appear to have been painted with a brush. This painterly effect is most noticeable near the silhouette edges of the objects, e.g., as seen in region 502 and elsewhere. It is to be understood that the degree to which loose paint appears can be controlled by defining the brush stroke textures to achieve a desired esthetic effect.

Figure 6A:
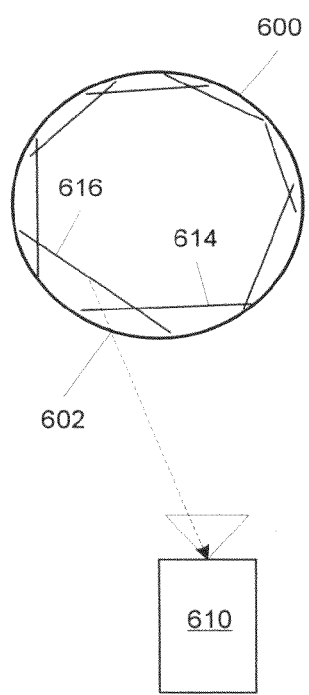
FIGS. 6A and 6B illustrate, in top view, ray tracing from the same point on a reference surface to cameras at different positions according to an embodiment of the present invention.
Figure 6B:
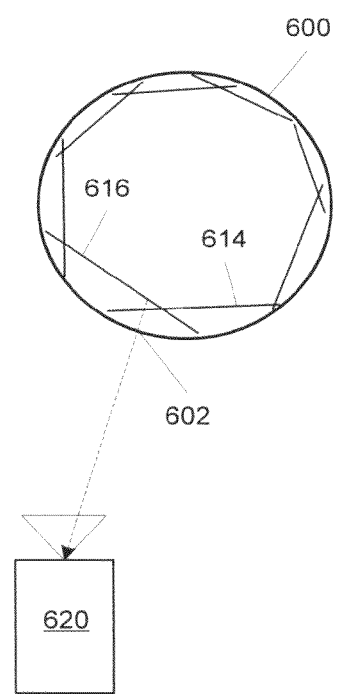

When an object is rotated (or the viewing angle is changed), a particular ray will encounter a different combination of points on the reference surface and cards. For example, FIGS. 6A and 6B show ray tracing from the same point 602 on a reference surface 600 to cameras 610 and 620, respectively, according to an embodiment of the present invention. Cameras 610 and 620 are positioned differently relative to surface 600, and the respective rays 612 and 622 project onto to different points on cards 614 and 616. Thus, the respective pixels associated with rays 612 and 622 can be rendered using different sets of attributes. Put differently, the brush stroke object (or card) associated with a particular point on a reference surface can vary with angle of incidence of the ray.

Figure 5B:
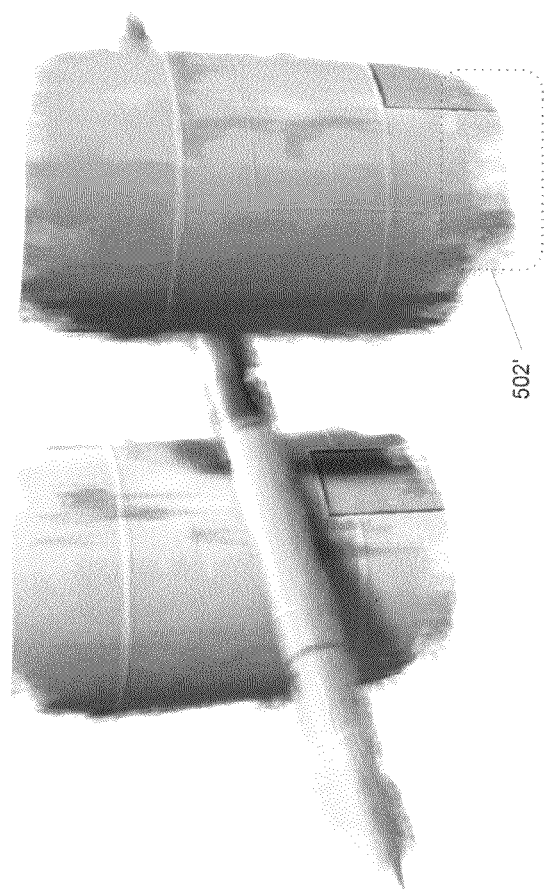

The effect of such changes is that as the angle at which an object is viewed gradually changes (e.g., by rotating the object or moving the camera), the painterly brush stroke effect changes subtly and smoothly, in such a way that the change is not distracting to the viewer. For example, FIG. 5B shows an image of the same objects as in FIG. 5A viewed from a different angle. Both images were generated using the same primary surface and cards; only the camera position has changed. It should be noted that the loose edges appear to move as part of the object, although some shifting has occurred. (For example, compare region 502 in FIG. 5A with region 502' in FIG. 5B.) This subtle shifting reduces the popping and other jarring artifacts associated with prior-art CGA techniques that attempt to emulate a painterly style.

Figure 7:
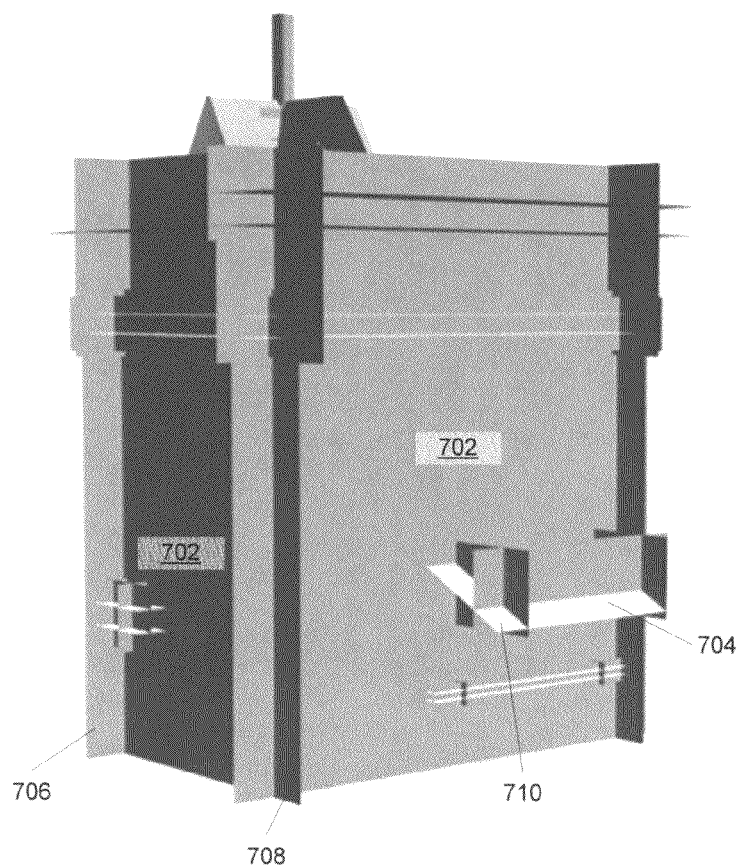
FIG. 7 shows a surface of a building with external auxiliary surfaces according to an embodiment of the present invention.

In the embodiments described above, the cards associated with a reference surface have been located inside the reference surface. This, however, is not required. For example, for reference surfaces with sharp edges and corners (e.g., surfaces of boxes or buildings), cards can be defined that extend outward from the edges. FIG. 7 shows a geometric model for a surface of a building 700 in accordance with an embodiment of the present invention. In this embodiment, rectangular reference surfaces making up the sides 702, awning 704, and other features have been extended beyond their intersections with other walls and features, and the extensions are external cards, e.g., cards 706, 708, 710.

Figure 8A:
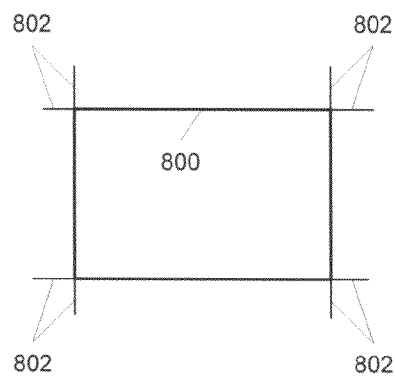
FIGS. 8A and 8B illustrate, in cross-section, external auxiliary surfaces for a box-like reference surface according to various embodiments of the present invention.
Figure 8B:
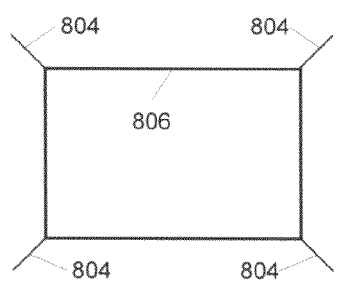

To further illustrate external cards, FIGS. 8A and 8B illustrate a cross-sectional view of box-like reference surfaces 800, 806 with external cards according to an embodiment of the present invention. In FIG. 8A, external cards 802 are formed by extending the sides of the reference surface beyond their intersections with other sides. In FIG. 8B, external cards 804 are formed at a 45-degree angle at each edge of reference surface 806. External cards are also referred to herein as "flanges."

Figure 9:
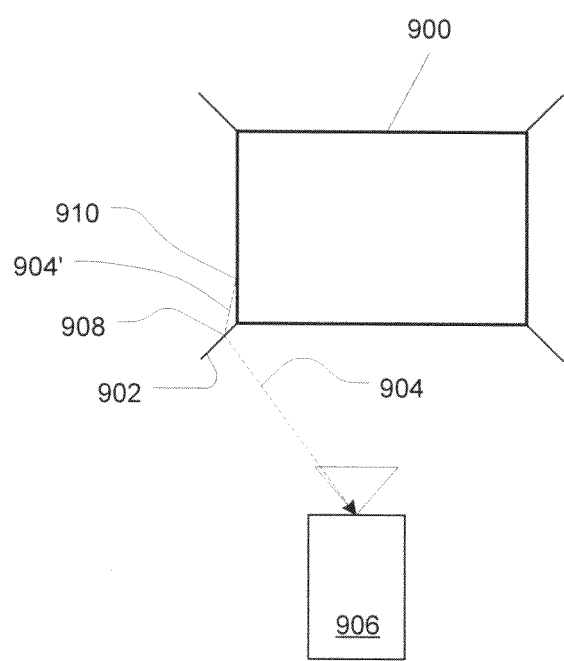
FIG. 9 illustrates ray tracing for a reference surface with an external auxiliary surface according to an embodiment of the present invention.

External cards can be used with ray tracing to color the object in a manner similar to the internal cards described above, except that rather than extending the ray in a straight line through the external card, the external card deflects the ray toward the reference surface. (The deflection can be akin to refraction.) FIG. 9 illustrates ray tracing for a reference surface 900 with a flange 902 according to an embodiment of the present invention. A ray 904 is drawn between a camera 906 and an intersection point 908 on flange 902. At point 908, ray 904 is deflected, and deflected ray 904' is extended toward reference surface 900, intersecting surface 900 at a point 910. In some embodiments, a "refractive index" is associated with the flange, and the refractive index and angle of incidence of ray 904 determine the angle by which the ray is deflected and thus the direction of ray 904'. Unlike a true refractive index, this index can also depend, e.g., on angle of incidence of the ray. The refractive index could also depend on position within the card; however, this makes for more complex calculations and transitional behavior (e.g., during panning) that is more difficult to predict.

Figure 10:
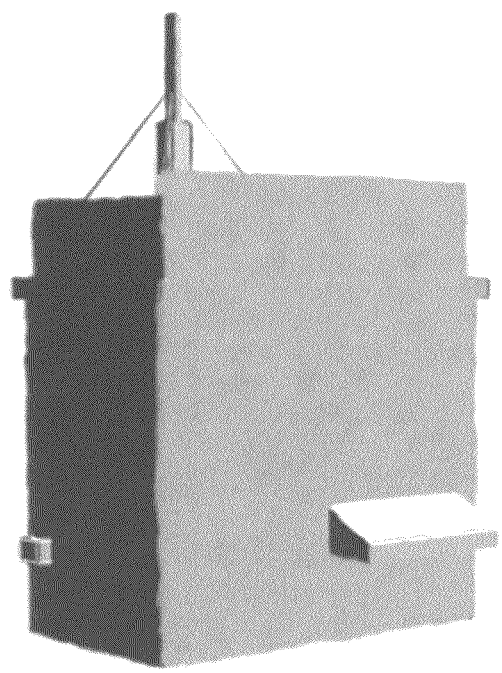
FIGS. 10-12 illustrate stages in image rendering using the reference surface and cards of FIG. 7 and a ray-trace technique according to an embodiment of the present invention.
Figure 11:
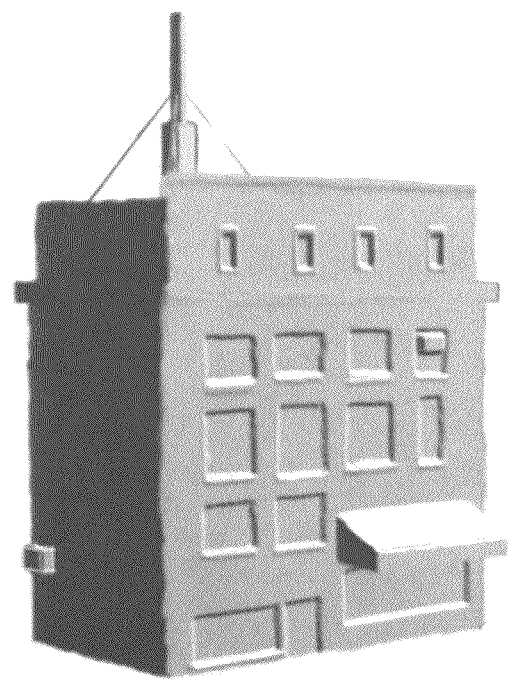
Figure 12:
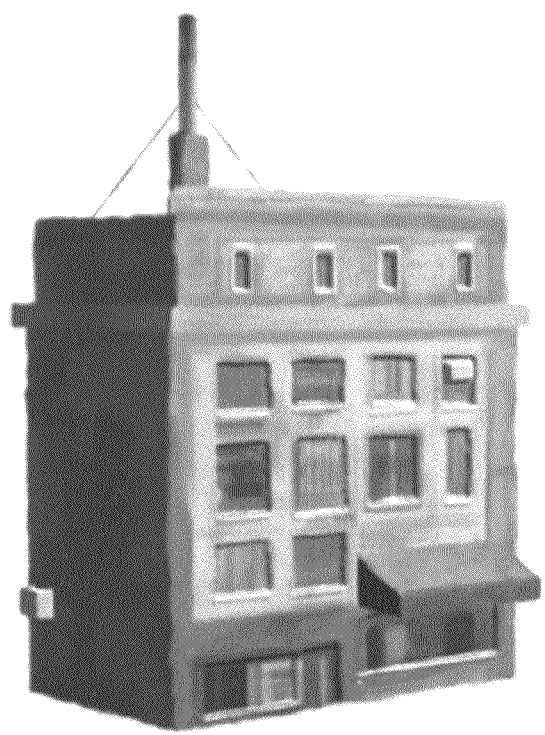

Shading computation proceeds similarly to the shading described above with reference to FIG. 4. Specifically, a transparency attribute is determined from point 908, while other attributes (color, surface normal, etc.) are determined from reference-surface point 910. Conventional shading algorithms can then be used to determine the pixel color from the attributes.

Where flanges are used, as the object rotates, the colors appearing near the corner as a result of refraction by the flange will visually sync up with the colors of the side that is coming into view. The viewer thus does not perceive the flange as geometry that abruptly disappears and/or reappears, which can be visually distracting. The flanges provide a smooth transition from one side of the object to another, in which the silhouette edges always look painterly FIGS. 10-12 illustrate image rendering using the reference surface and cards of FIG. 7 and the refractive ray-tracing technique of FIG. 9. In FIG. 10, surface normals from the reference surface have been mapped onto the cards, and transparency attributes associated with the cards have been applied.

In FIG. 11, additional non-silhouette textural detail is added (e.g., using conventional bump mapping and the reference surface). Finally, in FIG. 12, surface color is applied, resulting in an image of a building with a painterly appearance.

Figure 13:
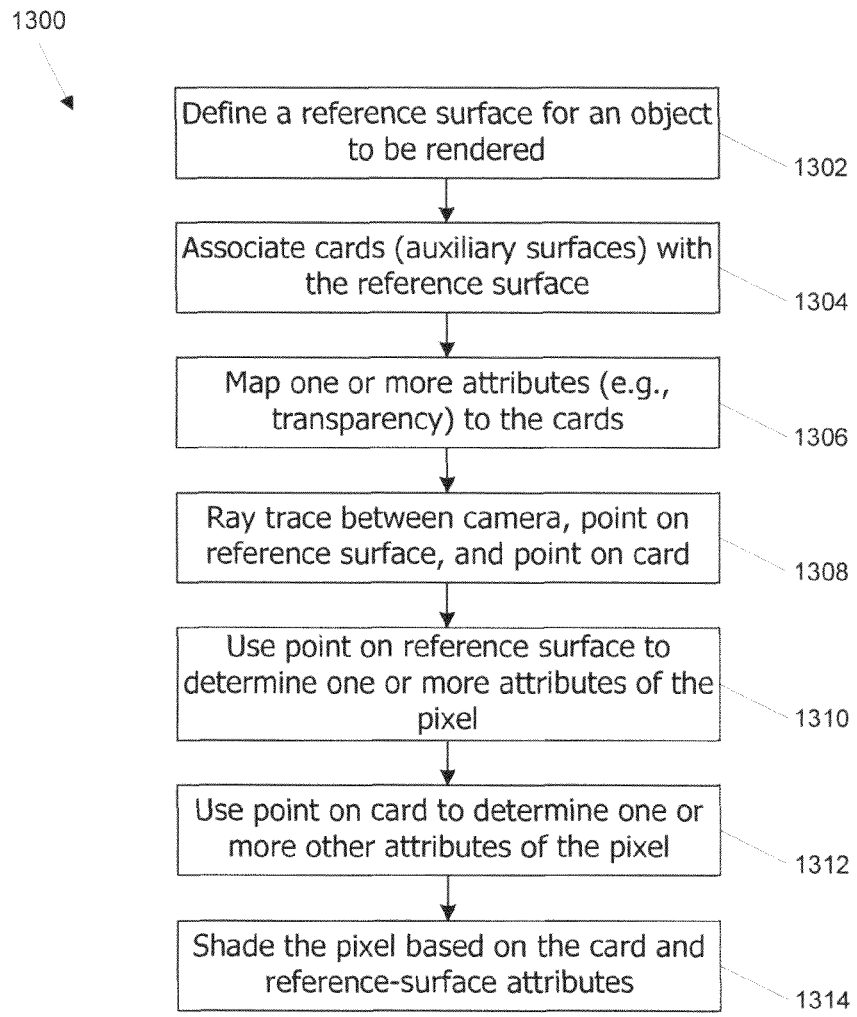
FIG. 13 is a flow diagram of a process for painterly rendering according to an embodiment of the present invention.

FIG. 13 is a flow diagram of a process 1300 for painterly rendering according to an embodiment of the present invention. At step 1302, a reference surface for an object to be rendered is defined. Conventional modeling techniques, including polygon meshes, subdivision surfaces or the like, may be used to define a reference surface. The reference surface advantageously has surface normals, color, texture and other attributes associated therewith.

At step 1304, auxiliary surfaces, such as cards (or auxiliary polygons or sub-surfaces), are associated with portions of the reference surface. As described above, the cards can be internal or external to the reference surface; the cards can also intersect the reference surface. Any number of cards can be generated, and a variety of techniques may be used to generate cards. For example, fur-growing programs can be used to grow the cards inside or outside of the surface. Cards can also be generated based on edges of the reference surface (e.g., lateral extensions of a segment of the reference surface as shown in FIG. 7 and FIG. 8A and/or flanges as shown in FIG. 8B). Dimensions of a card may be chosen as desired, e.g., based on a desired brushstroke length, width, etc. Card dimensions can be defined with reference to observed patterns in a specific artist's brush strokes (for instance, the length of a card can correspond to the length of a brush stroke) or with reference to the esthetic judgment of an art director (or other creator of animated images).

At step 1306, one or more attributes are mapped onto the cards. For example, transparency attributes can be mapped onto the cards. The attributes can mimic attributes of brushstrokes characteristic of a specific artist or can be designed arbitrarily based on the esthetic judgment of the art director.

At step 1308, a ray is traced from a point on the reference surface to a camera. The ray trace can also proceed in the opposite direction, i.e., from the camera, through a screen pixel that is to be shaded and onto the reference surface. (It is to be understood that terms like "camera" and "screen" are used herein to refer to a defined viewing point, viewing direction, orientation and aperture for an image to be rendered rather than to physical cameras and screens.) The ray is further extended from the reference surface to intersect one of the cards. As noted above, rays incident on the same point of the reference surface from different angles will generally intersect different points on the card (or points on different cards).

At step 1310, the point on the reference surface is used to determine one or more attributes of the surface to be shaded. For example, the reference surface may determine a surface normal (and related lighting attributes), a basic color, and one or more textures (e.g., color patterns) to be applied.

At step 1312, the point on the card is used to determine one or more other attributes of the surface to be shaded. For example, the point on the card may determine a transparency attribute.

At step 1314, the pixel is shaded using the one or more attributes determined from the reference surface and the one or more attributes determined from the card. Conventional shading techniques and algorithms may be applied to the attribute values. The result of shading is color data defining a color for the pixel.

It will be appreciated that process 1300 is illustrative and that variations and modifications are possible. Steps described as sequential may be executed in parallel, order of steps may be varied, and steps may be modified or combined. Those skilled in the art will understand that an animated image may include any number of objects, and process 1300 can be used to generate images of arbitrary complexity. Thus, a ray may pass through a first object and impinge on an object behind it; an object whose surface has reflective or refractive properties may reflect or refract all or part of the ray in a different direction; and so on. All objects that a ray touches may contribute to the pixel color.

Pixel data for the pixels of an image can be stored and used to display an image in any manner desired. For instance, the pixel data can be stored in a computer-readable storage medium (e.g., volatile memory, non-volatile memory, disk drive, compact disk (CD) or digital versatile disk (DVD), magnetic disk, etc.). The data can be used to drive a digital or analog display device, such as a computer monitor or projection system; images defined by the pixel data can also be transferred to film or other similar medium.

While the invention has been described with respect to specific embodiments, one skilled in the art will recognize that numerous modifications are possible. For example, while the embodiments described herein use cards to determine transparency and coordinates and the primary (reference) surface for all other surface attributes, it is to be understood that any subset of attributes could be associated with the cards while another subset is associated with the reference surface. Further, multiple sets of cards could be associated with a reference surface, with each set of cards being associated with a different subset of surface attributes. For example, a set of cards associated with surface normals could be defined.

The auxiliary surfaces are identified as "cards" in certain embodiments herein and are depicted as planar and polygonal, but it is to be understood that an auxiliary surface could have curved surfaces and/or non-straight edges; the particular shape of the auxiliary surface is not critical to the present invention. Cards or other auxiliary surfaces can be internal and/or external, and they can touch or intersect the reference surface. As noted above, auxiliary surfaces can be ignored when determining shadow volumes or the like during modeling and lighting operations.

In some embodiments, the multi-surface rendering techniques described herein can be used in conjunction with other techniques to create a brush-stroked look for a rendered image. For example, multi-surface rendering can be practiced using objects with reference surfaces whose surface normals have been perturbed to achieve a brush-stroke effect. Examples of techniques for perturbing surface normals to achieve a brush-stroke effect are described in commonly-owned co-pending U.S. Provisional Patent Application No. 60/953,665.

Some components of the processes described herein can be implemented using suitably-configured computer systems. Such systems may be of conventional design and may include standard components such as microprocessors, monitors, keyboards, mice, magnetic disk drives, CD or DVD drives, flash drives, network interface components, and the like. In addition, interconnected groups of computers (e.g., server farms) may be used to practice aspects of the present invention. While the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as CD or DVD, flash memory, and the like. Such programs may also be encoded and transmitted using carrier signals adapted for transmission via wired, optical, and/or wireless networks conforming to a variety of protocols, including the Internet. Computer readable media encoded with the program code may be packaged with a compatible device or provided separately from other devices (e.g., via Internet download to a storage medium connected to the recipient's computer system).

Thus, although the invention has been described with respect to specific embodiments, it will be appreciated that the invention is intended to cover all modifications and equivalents within the scope of the following claims.

What is claimed is:

1. A method for generating an image, the method comprising:
   defining a reference surface for an object, the reference surface having at least a first attribute associated therewith, the first attribute having a value that is variable as a function of position on the reference surface;
   defining an auxiliary surface for the object, the auxiliary surface being positioned in relation to a specified portion of the reference surface, the auxiliary surface having at least a transparency attribute associated therewith, the transparency attribute having a value that is variable as a function of position on the auxiliary surface, wherein the first attribute and the transparency attribute are different attributes, and wherein the auxiliary surface has a different geometry from the reference surface;
   tracing a ray for a pixel of an image raster, the ray intersecting a point on the reference surface and a point on the auxiliary surface;
   determining a value of the first attribute based at least in part on the intersection point of the ray with the reference surface and independently of the intersection point of the ray with the auxiliary surface;
   determining a value of the transparency attribute based at least in part on the intersection point of the ray with the auxiliary surface and independently of the intersection point of the ray with the reference surface; and
   using the values of the first attribute and the transparency attribute to determine a pixel color for the pixel.

2. The method of claim 1 wherein the reference surface establishes a boundary between an interior region and an exterior region, and wherein defining one or more auxiliary surfaces includes positioning the auxiliary surfaces in the interior region.

3. The method of claim 1 wherein the reference surface establishes a boundary between an interior region and an exterior region, and wherein defining one or more auxiliary surfaces includes positioning the auxiliary surfaces in the exterior region.

4. The method of claim 3 wherein
the reference surface includes a first planar portion and a second planar portion not coplanar with the first planar portion, the first planar portion and the second planar portion meeting at an edge line; and
defining one or more auxiliary surfaces for the object includes defining a first planar auxiliary surface that extends from the edge line into the exterior region.

5. The method of claim 4 wherein the first planar auxiliary surface is coplanar with the first planar portion of the reference surface.

6. The method of claim 5 wherein defining one or more auxiliary surfaces for the object includes defining a second planar auxiliary surface that extends from the edge line into the exterior region, the second planar auxiliary surface being coplanar with the second portion of the reference surface.

7. The method of claim 4 wherein the first planar auxiliary surface is not coplanar with either of the first or second planar portions of the reference surface.

8. The method of claim 1 wherein the reference surface includes a non-planar portion, and wherein the one or more auxiliary surfaces include a planar auxiliary surface that is positioned in relation to the non-planar portion of the reference surface.

9. The method of claim 1 wherein the reference surface has associated therewith at least a surface normal attribute, a color attribute, and a texture attribute.

10. The method of claim 1 wherein the transparency attribute varies in a manner that mimics a pattern of paint applied by a paintbrush.

11. The method of claim 1 wherein defining one or more auxiliary surfaces includes positioning each auxiliary surface in a fixed relationship to a portion of the reference surface.

12. The method of claim 11 wherein the reference surface is deformable and wherein the auxiliary surfaces are deformable to match a deformation in the reference surface.

13. The method of claim 1 wherein the one or more auxiliary surfaces comprise a plurality of planar auxiliary surfaces, each planar auxiliary surface being smaller than the reference surface and positioned in relation to a different portion of the reference surface.

14. The method of claim 1 further comprising:
storing the image on a storage medium.

15. The method of claim 14 wherein the storage medium comprises film.

16. The method of claim 14 wherein the storage medium comprises a computer readable storage medium that stores a digital representation of the image.

17. The method of claim 14 further comprising:
displaying the image.

18. A method for generating an image, the method comprising:
defining a reference surface for an object, the reference surface establishing a boundary between an interior region and an exterior region, the reference surface further having at least a first attribute associated therewith, wherein the reference surface includes at least a first planar portion and a second planar portion not coplanar with the first planar portion, the first planar portion and the second planar portion meeting at an edge line;
defining a first planar auxiliary surface for the object, the first planar auxiliary surface extending from the edge line into the exterior region, the first planar auxiliary surface having a transparency attribute associated therewith, wherein the first attribute is an attribute other than transparency, and wherein the first planar auxiliary surface has a different geometry from the reference surface;
tracing a primary ray for a pixel of an image raster to an intersection point with the first planar auxiliary surface;
determining a value for the transparency attribute based at least in part on the intersection point of the primary ray with the first planar auxiliary surface and independently of the reference surface;
tracing a deflected ray from the intersection point of the primary ray with the first planar auxiliary surface, wherein the deflected ray is deflected toward the reference surface relative to the primary ray;
identifying an intersection point of the deflected ray with the reference surface;
determining a value of the first attribute based at least in part on the intersection point of the deflected ray with the reference surface and independently of the first planar auxiliary surface; and
using the values of the first attribute and the transparency attribute to determine a pixel color for the pixel.

19. The method of claim 18 further comprising:
computing a deflection angle for the deflected ray relative to the primary ray, wherein the deflection angle depends at least in part on an angle of incidence of the primary ray on the first planar auxiliary surface.

20. The method of claim 18 wherein the first planar auxiliary surface is coplanar with the first planar portion of the reference surface.

21. The method of claim 20 wherein defining one or more auxiliary surfaces for the object includes defining a second planar auxiliary surface that extends from the edge line into the exterior region, the second planar auxiliary surface being coplanar with the second portion of the reference surface.

22. The method of claim 18 wherein the first planar auxiliary surface is not coplanar with either of the first or second planar portions of the reference surface.

23. The method of claim 18 wherein the reference surface has associated therewith at least a surface normal attribute, a color attribute, and a texture attribute.

24. The method of claim 18 further comprising:
storing the image on a storage medium.

25. The method of claim 24 wherein the storage medium comprises film.

26. The method of claim 24 wherein the storage medium comprises a computer readable storage medium that stores a digital representation of the image.

27. The method of claim 24 further comprising:
displaying the image.

* * * * *